United States Patent
Bonanno et al.

(10) Patent No.: US 9,135,012 B2
(45) Date of Patent: Sep. 15, 2015

(54) INSTRUCTION FILTERING

(75) Inventors: James J. Bonanno, Wappingers Falls, NY (US); Adam B. Collura, Hyde Park, NY (US); Ulrich Mayer, Weil im Schoenbuch (DE); Brian R. Prasky, Wappingers Falls, NY (US); Anthony Saporito, Highland, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 13/523,170

(22) Filed: Jun. 14, 2012

(65) Prior Publication Data

US 2013/0339683 A1 Dec. 19, 2013

(51) Int. Cl.
*G06F 9/38* (2006.01)
*G06F 9/30* (2006.01)

(52) U.S. Cl.
CPC .............. *G06F 9/3844* (2013.01); *G06F 9/30* (2013.01)

(58) Field of Classification Search
None
See application file for complete search history.

(56) References Cited

U.S. PATENT DOCUMENTS

| | | | | |
|---|---|---|---|---|
| 5,564,118 A | * | 10/1996 | Steely et al. | 712/240 |
| 5,687,360 A | * | 11/1997 | Chang | 712/240 |
| 5,742,804 A | | 4/1998 | Yeh et al. | |
| 5,828,874 A | * | 10/1998 | Steely et al. | 712/240 |
| 6,324,643 B1 | | 11/2001 | Krishnan et al. | |
| 6,374,348 B1 | | 4/2002 | Irie et al. | |
| 6,397,326 B1 | * | 5/2002 | Horton et al. | 712/240 |
| 6,477,639 B1 | | 11/2002 | Krishnan et al. | |
| 7,493,480 B2 | * | 2/2009 | Emma et al. | 712/240 |
| 7,707,396 B2 | * | 4/2010 | Bradford et al. | 712/238 |
| 2002/0087852 A1 | * | 7/2002 | Jourdan et al. | 712/240 |
| 2003/0070062 A1 | | 4/2003 | Krishnan et al. | |

(Continued)

OTHER PUBLICATIONS

"Method for adding a confidence mechanism to a branch prediction corrector"; http://www.ip.com/pubview/IPCOM000137911D; Jun. 29, 2006, 5 pages.

(Continued)

*Primary Examiner* — Corey S Faherty
(74) *Attorney, Agent, or Firm* — Cantor Colburn LLP; Margaret McNamara

(57) ABSTRACT

Embodiments relate to instruction filtering. An aspect includes a system for instruction filtering. The system includes memory configured to store instructions accessible by a processor, and the processor includes a tracking array and a tracked instruction logic block. The processor is configured to perform a method including detecting a tracked instruction in an instruction stream, and storing an instruction address of the tracked instruction in the tracking array based on detecting and executing the tracked instruction. The method also includes accessing the tracking array based on an address of instruction data of a subsequently fetched instruction to locate the instruction address of the tracked instruction in the tracking array as an indication of the tracked instruction. Instruction text of the subsequently fetched instruction is marked to indicate previous execution based on the tracking array. An action of the tracked instruction logic block is prevented based on the marked instruction text.

8 Claims, 8 Drawing Sheets

(56) References Cited

U.S. PATENT DOCUMENTS

2004/0015683 A1* 1/2004 Emma et al. .................. 712/240
2004/0225871 A1* 11/2004 Irie et al. ........................ 712/237
2005/0278513 A1 12/2005 Aristodemou et al.
2008/0120496 A1* 5/2008 Bradford et al. ............... 712/239
2009/0204798 A1* 8/2009 Alexander et al. ............ 712/240
2010/0017586 A1 1/2010 Gelman et al.
2013/0332716 A1* 12/2013 Bonanno et al. .............. 712/240

OTHER PUBLICATIONS

"Method for dual value prediction in a branch prediction corrector"; http://www.ip.com/pubview/IPCOM000127008D; Aug. 17, 2005, 4 pages.
"Method to Exclude Bad Patterns from a Pattern History Table Branch Predictor"; http://www.ip.com/pubview/IPCOM000191968D; Jan. 19, 2010, 5 pages.

* cited by examiner

INSTRUCTION FILTERING

BACKGROUND

The present invention relates generally to computer processing systems, and more specifically, to instruction filtering.

An instruction pipeline in a computer processor improves instruction execution throughput by processing instructions using a number of pipeline stages, where multiple stages can act on different instructions of an instruction stream in parallel. A conditional branch instruction in an instruction stream may result in a pipeline stall if the processor waits until the conditional branch instruction is resolved in an execution stage in the pipeline before fetching a next instruction in an instruction fetching stage for the pipeline. A branch predictor may attempt to guess whether a conditional branch will be taken or not. Branch target prediction attempts to guess, based on prior execution result, a target of a taken conditional or unconditional branch before it is computed by decoding and executing the instruction itself. A branch target may be a computed address based on an offset and/or an indirect reference through a register.

A branch target buffer (BTB) is used to predict the target of a predicted taken branch instruction based on the address of the branch instruction. Predicting the target of the branch instruction can prevent pipeline stalls by not waiting for the branch instruction to reach the execution stage of the pipeline to compute the branch target address. By performing branch target prediction, the branch's target instruction decode may be performed in the same cycle or the cycle after the branch instruction instead of having multiple bubble/empty cycles between the branch instruction and the target of the predicted taken branch instruction. Other branch prediction components that may be included in the BTB or implemented separately include, but are not limited to, a branch history table and a pattern history table for predicting the direction of the branch. A branch history table can predict the direction of a branch (taken vs. not taken) as a function of the branch address. A pattern history table can assist with direction prediction by associating a direction prediction for the given branch with the path of branches that was encountered in reaching the given branch that is to be predicted.

Instructions supporting branch prediction are examples of non-functional accelerator type instructions that are not critical to correct program flow but can enhance program flow. Repeated execution of certain non-functional accelerator type instructions can impact overall processing throughput and the effectiveness of accelerator functions.

SUMMARY

Exemplary embodiments include a system for instruction filtering. The system includes memory configured to store instructions accessible by a processor, and the processor includes a tracking array and a tracked instruction logic block. The processor is configured to perform a method including detecting a tracked instruction in an instruction stream, and storing an instruction address of the tracked instruction in the tracking array based on detecting and executing the tracked instruction. The method also includes accessing the tracking array based on an address of instruction data of a subsequently fetched instruction to locate the instruction address of the tracked instruction in the tracking array as an indication of the tracked instruction. The method further includes marking instruction text of the subsequently fetched instruction to indicate that the subsequently fetched instruction is a previously executed tracked instruction based on the indication of the tracked instruction from the tracking array. An action of the tracked instruction logic block is prevented based on detecting the marked instruction text.

Further exemplary embodiments include a computer-implemented method for instruction filtering. The method includes detecting, by a processor, a tracked instruction in an instruction stream, and storing an instruction address of the tracked instruction in a tracking array based on detecting and executing the tracked instruction. The method also includes accessing the tracking array based on an address of instruction data of a subsequently fetched instruction to locate the instruction address of the tracked instruction in the tracking array as an indication of the tracked instruction. The method further includes marking, by the processor, instruction text of the subsequently fetched instruction to indicate that the subsequently fetched instruction is a previously executed tracked instruction based on the indication of the tracked instruction from the tracking array. The method additionally includes preventing an action of a tracked instruction logic block based on detecting the marked instruction text.

Additional exemplary embodiments include a computer program product for instruction filtering. The computer program product includes a tangible storage medium readable by a processing circuit and storing instructions for execution by the processing circuit for performing a method. The method includes detecting, by the processing circuit, a tracked instruction in an instruction stream, and storing an instruction address of the tracked instruction in a tracking array based on detecting and executing the tracked instruction. The method also includes accessing the tracking array based on an address of instruction data of a subsequently fetched instruction to locate the instruction address of the tracked instruction in the tracking array as an indication of the tracked instruction. The method further includes marking, by the processing circuit, instruction text of the subsequently fetched instruction to indicate that the subsequently fetched instruction is a previously executed tracked instruction based on the indication of the tracked instruction from the tracking array. An action of a tracked instruction logic block is prevented based on detecting the marked instruction text.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Exemplary embodiments provide instruction filtering. Non-functional accelerator type instructions are not critical to correct program flow but can enhance program flow. A branch prediction preload instruction is an example of a non-functional accelerator type instruction that can preload a branch predictor with a branch prediction. Without filtering, repeated execution of the branch preload instruction continually installs the preloaded branch prediction into the branch predictor. These reinstallations create redundant, equivalent branch predictions in the branch predictor. Functionally, redundant predictions do not affect microprocessor data integrity; however, redundant predictions reduce the overall number of unique predicted branches that can be stored in the branch predictor. Redundant predictions can impact overall performance, as each preload may cause the eviction of other, unique branch predictions. Exemplary embodiments perform instruction filtering by leveraging a table that is synchronous with an instruction cache so as to perform actions associated with a tracked instruction a single time. Although embodiments are described in reference to branch prediction preload instructions, it will be appreciated that instruction filtering can be performed for any number of other non-functional accelerator type instructions.

Figure 1:
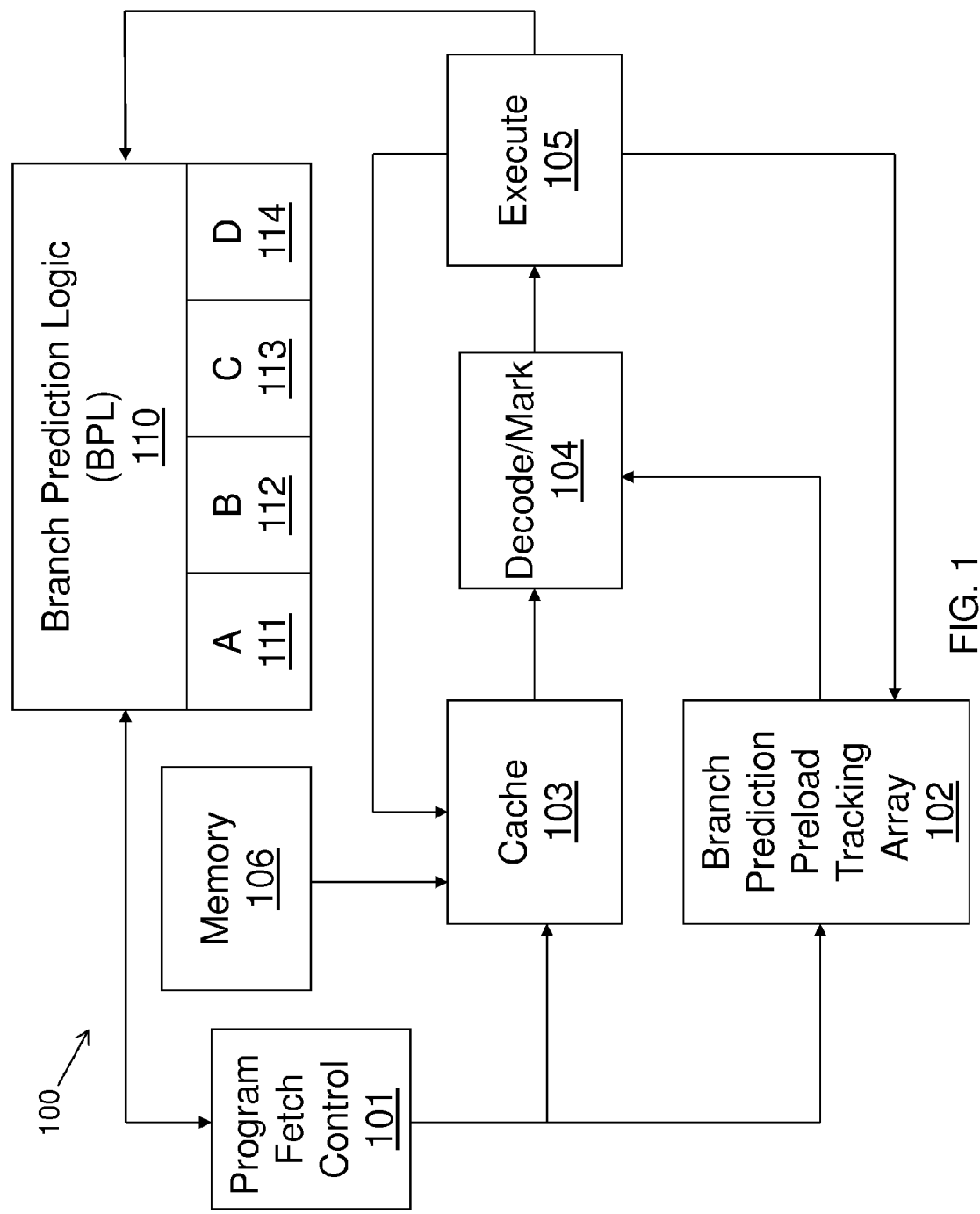
FIG. 1 depicts a processing system according to an embodiment.

FIG. 1 depicts a block diagram a processing system 100 according to an embodiment. The processing system 100 includes program fetch control 101, a tracking array 102, an instruction cache 103, instruction decode and marking logic 104, an execution unit 105, memory 106, and branch prediction logic (BPL) 110. The processing system 100 can be embodied in a single processor or processing circuit of a computer, or can be distributed between multiple components in a computer system. For example, memory 106 can be internal or external to a processor of the processing system 100. The memory 106 may include any type of volatile or non-volatile memory, including one or more levels of cache memory. Instructions and data can be stored in memory 106, and the instruction cache 103 may access instructions in memory 106 and store the instructions to be fetched. A data cache (not depicted) may also be included in the processing system 100.

In the example of FIG. 1, instruction tracking and filtering is performed on branch prediction preload instructions as the tracked instructions. A branch prediction preload instruction can specify branch prediction information, such as a predicted branch instruction address, a predicted branch's target address, a branch type, and may include additional information. The branch prediction logic 110 is an example of a tracked instruction logic block. Accordingly, the tracking array 102 is also referred to as a branch prediction preload tracking array. The branch prediction logic 110 stores branch predictions in a number of entries that can be organized as congruence classes of sets of entries. An example congruence class includes entry A 111, entry B 112, entry C 113, and entry D 114. When a branch prediction preload instruction is first executed at execution unit 105, a prefetch of the instruction cache 103 may be initiated to provide the instruction cache 103 a head start on preloading the predicted branch's target instruction stream into the instruction cache 103 if it is not there already. The branch prediction information is passed to the branch prediction logic 110 to be stored. The instruction address of the branch, its direction and address of its target are stored into the least recently used (LRU) entry (one of entry A 111, entry B 112, entry C 113, entry D114) of a particular congruence class, accessed using a subset of the instruction address of the branch instruction, after the branch prediction preload instruction is executed. Once the branch prediction information is stored, it is accessible by the branch prediction logic 110, such that the associated branch can be dynamically predicted via the program fetch control logic 101 in the expected direction when the predicted branch instruction is executed at execution unit 105. Prefetching using the predicted target address of the branch enables the instruction cache 103 to have the branch's target instruction stream ready at branch execution time.

Upon encountering the same branch prediction preload instruction two or more times (for example, within a loop or a frequently called subroutine), rather than simply installing a redundantly executed branch prediction preload instruction's information into the next LRU location of a particular congruence class (one of entry A 111, entry B 112, entry C 113, entry D114), instruction filtering is performed. Without instruction filtering, if the congruence class was fully populated with useful predictions, the LRU would remove a useful prediction and install a redundant preload entry instead. The overwritten branch prediction could no longer be dynamically predicted, which could potentially result in throughput penalties encountered with branch mispredictions, delayed taken branch redirect instruction stream, and no cache prefetching as a function of a BTB taken prediction. Exemplary embodiments use the tracking array 102 to record execution of tracked instructions and mark subsequent instances of the tracked instruction using the instruction decode and marking logic 104 to prevent an action of a tracked instruction logic block (e.g., branch prediction logic 110) based on detecting the marked instruction. For example, if a predicted branch is preloaded based on a branch prediction preload instruction, then subsequent execution of the same branch prediction preload instruction does not install a new, redundant branch prediction into the branch prediction logic 110.

Figure 2:
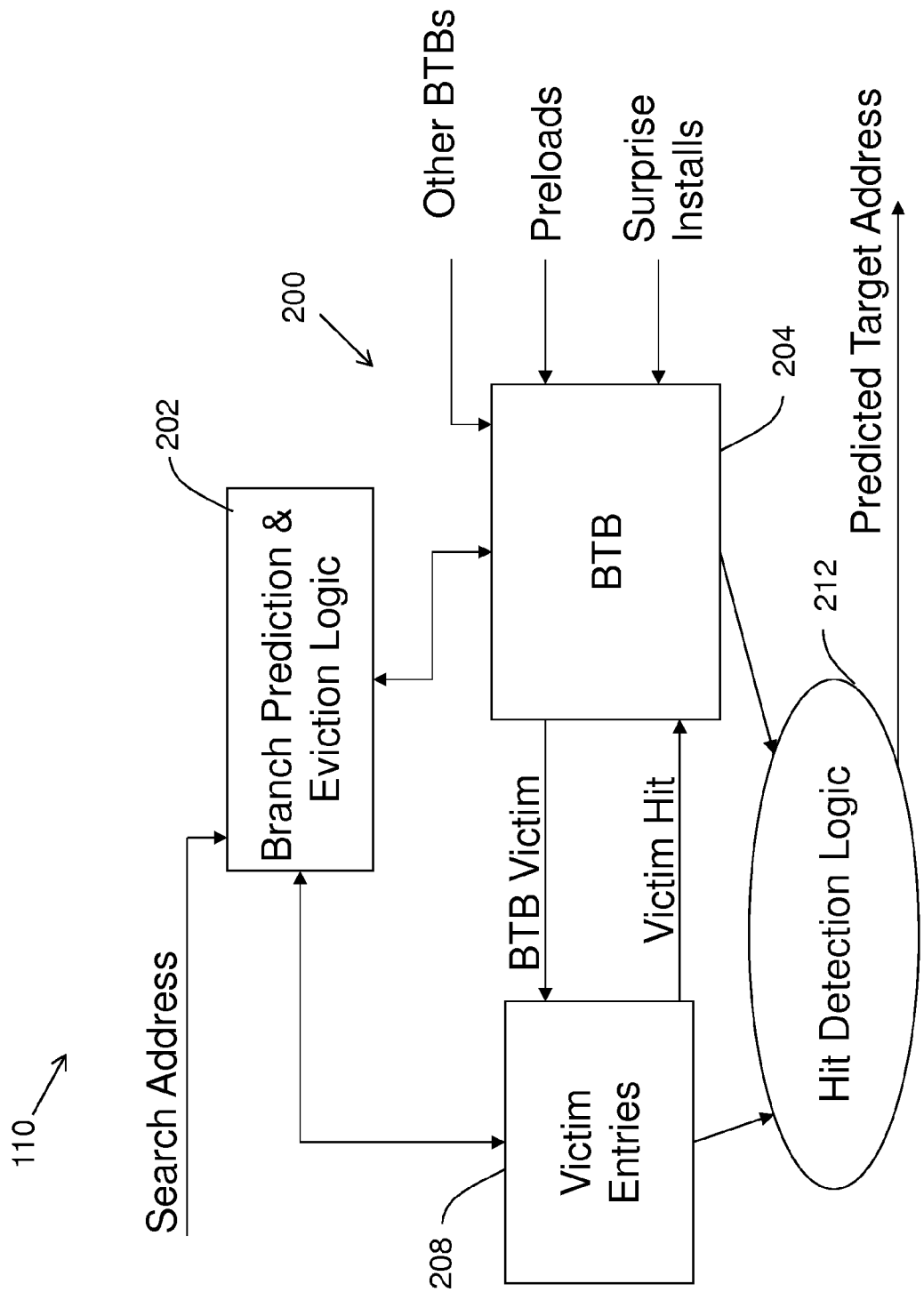
FIG. 2 depicts branch prediction logic according to an embodiment.

FIG. 2 depicts an example of the BPL 110 of FIG. 1 in greater detail. The example BPL 110 of FIG. 2 includes a branch predictor 200 with a branch target buffer (BTB) 204 and a victim entries table 208. The BTB 204 and victim entries table 208 may both be set associative, including multiple sets (columns) of BTB entries. The BPL 110 also includes branch prediction and eviction logic 202 and hit detection logic 212. The branch prediction and eviction logic 202 can control access and updates of BTB entries in the BTB 204 and victim entries table 208, as well as movement of BTB entries between the BTB 204 and victim entries table 208. In an exemplary embodiment, BTB 204 is a primary BTB and victim entries table 208 is a table of BTB entries removed from the primary BTB. In the example of FIG. 2, BTB installs are performed primarily through BTB 204; however, in other embodiments, BTB installs can be performed relative to other BTB structures, such as direct installation into another BTB (not depicted) or victim entries table 208.

Figure 3:
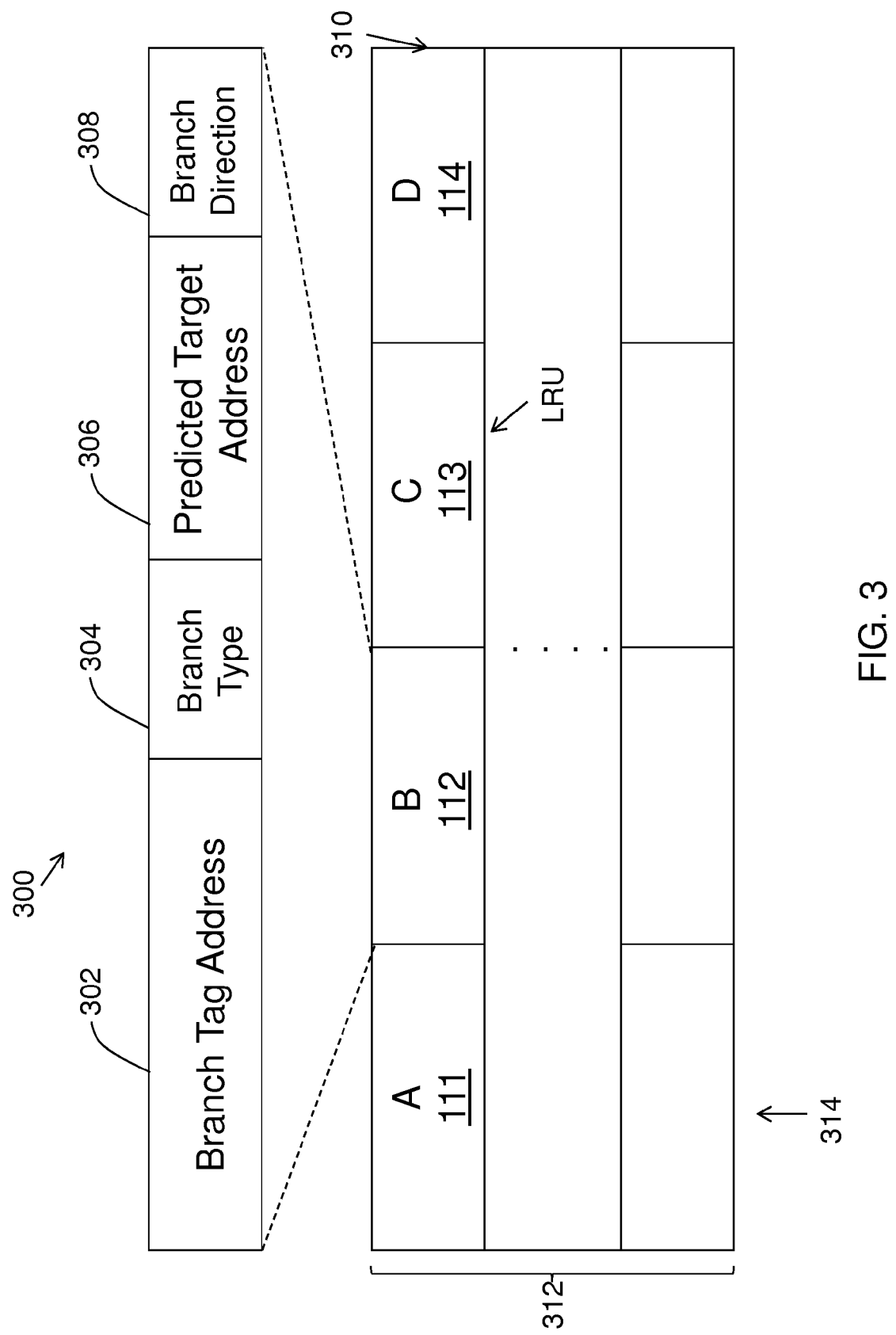
FIG. 3 depicts a branch target buffer entry according to an embodiment.

A generic example of a BTB entry is depicted in FIG. 3 as BTB entry 300 (also referred to as entry 300), which includes a branch tag address 302, a branch type field 304, a predicted target address 306, and a branch direction 308. With continued reference to FIGS. 1-3, the branch tag address 302 is used to locate an entry within a BTB row 310, where each of the BTB 204 and victim entries table 208 of FIG. 2 can include multiple BTB rows 312 and multiple set associative BTB entries per BTB row 310. Each BTB row 310 is also referred to as a congruence class. The example row 310 includes entry A 111, entry B 112, entry C 113, and entry D114 of FIG. 1, where each entry 111-114 is a different column or set 314. An LRU identifier (LRU) can also be tracked to assist in determining which BTB entry 300 was least recently used for removal/replacement of entries. The branch type field 304 can be populated on a preload of a branch instruction to provide additional information about a predicted branch. For a non-preload branch, the branch type field 304 is also populated with a value, for example, a value representing the branch type associated with the type of branch that was installed or a pre-defined default. The branch direction 308 can indicate whether the associated branch is to be guessed/predicted taken or not taken. Additional fields may also be included in each BTB entry 300.

In an exemplary embodiment, an address of an instruction fetch by the program fetch control 101 of FIG. 1 is used as a search address to access the BPL 110 and predict any associated branch and, if taken, then also predict the branch's target address. BTB 204 can contain primary BTB entries of interest for predicting branch target addresses. The victim entries 208 can include BTB entries that have been recently evicted from the BTB 204 by the branch prediction and eviction logic 202. When a BTB entry is evicted from BTB 204, it is written as a BTB victim to the victim entries 208. Eviction can be based on monitoring for least recently used BTB entries and determining which locations in the BTB 204 to overwrite based on receiving an installation request from an install source, such as a surprise install, a branch prediction preload instruction, a victim hit, or other BTBs. A surprise install is based on a branch from a branch instruction that was not predicted by the hit detection logic 212 but was detected as a branch only by the decode and marking logic 104 of FIG. 1. The victim entries 208 and the BTB 204 can both provide input to hit logic 212 to determine whether a match or "hit" is located based on the search address. If a match is found, the hit logic 212 outputs a predicted target address. If the match was from the victim entries 208 (a victim hit), the corresponding BTB entry can be returned to the BTB 204 as a victim install, such that the most recent and relevant branch target predictions are maintained in the BTB 204. The branch prediction and eviction logic 202 may also manage other branch prediction functions/predictors.

Figure 4:
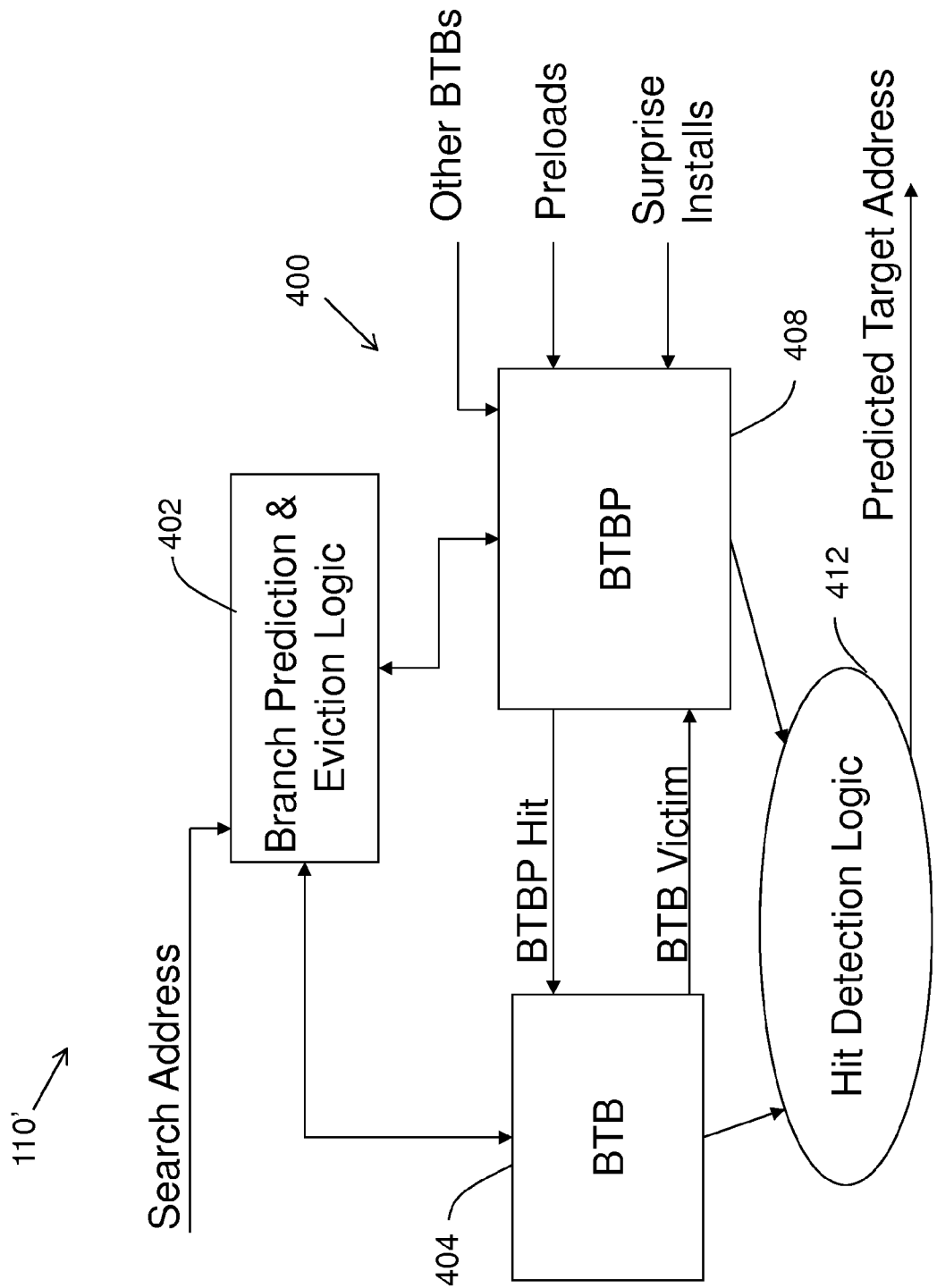
FIG. 4 depicts branch prediction logic according to another embodiment.

FIG. 4 depicts an alternate embodiment of the BPL 110 of FIG. 1 in greater detail as BPL 110'. The example BPL 110' of FIG. 4 is similar to the BPL 110 of FIG. 2 and includes a branch predictor 400 with a branch target buffer (BTB) 404 and a branch target buffer preload table (BTBP) 408. The BTB 404 and BTBP 408 may both be set associative, including multiple sets (columns) of BTB entries. The BPL 110' also includes branch prediction and eviction logic 402 and hit detection logic 412. The branch prediction and eviction logic 402 can control access and updates of BTB entries in the BTB 404 and BTBP 408, as well as movement of BTB entries between the BTB 404 and BTBP 408. In an exemplary embodiment, BTB installs are performed primarily through BTBP 408, with BTB entries passed from BTBP 408 to BTB 404 based on detecting a BTBP hit in the BTBP 408. Each entry in the BTB 404 and BTBP 408 can also be formatted as the BTB entry 300 of FIG. 3.

In an exemplary embodiment, an address of a branch instruction fetched by the program fetch control 101 of FIG. 1 is used as a search address to access the BPL 110' and predict a branch target address. When looking for branch predictions, both the BTB 404 and BTBP 408 are read. Either one can provide a branch prediction if it contains an entry with a branch address tag 302 matching the search address. The BTBP 408 and the BTB 404 both provide input to hit detection logic 412 to determine whether a match or "hit" is located based on the search address. If a match is found, the hit detection logic 412 outputs a predicted target address. If the match was from the BTBP 408, a corresponding matching entry can be installed to the BTB 404 as a BTBP hit to overwrite a BTB victim entry in the BTB 404, such that the most recent and relevant branch target predictions are maintained in the BTB 404. Similar to the BTB 204 of FIG. 2, the BTBP 408 supports installation requests from a variety of install sources, such as a surprise install, a branch prediction preload instruction, a victim hit, or other BTBs.

Figure 5:
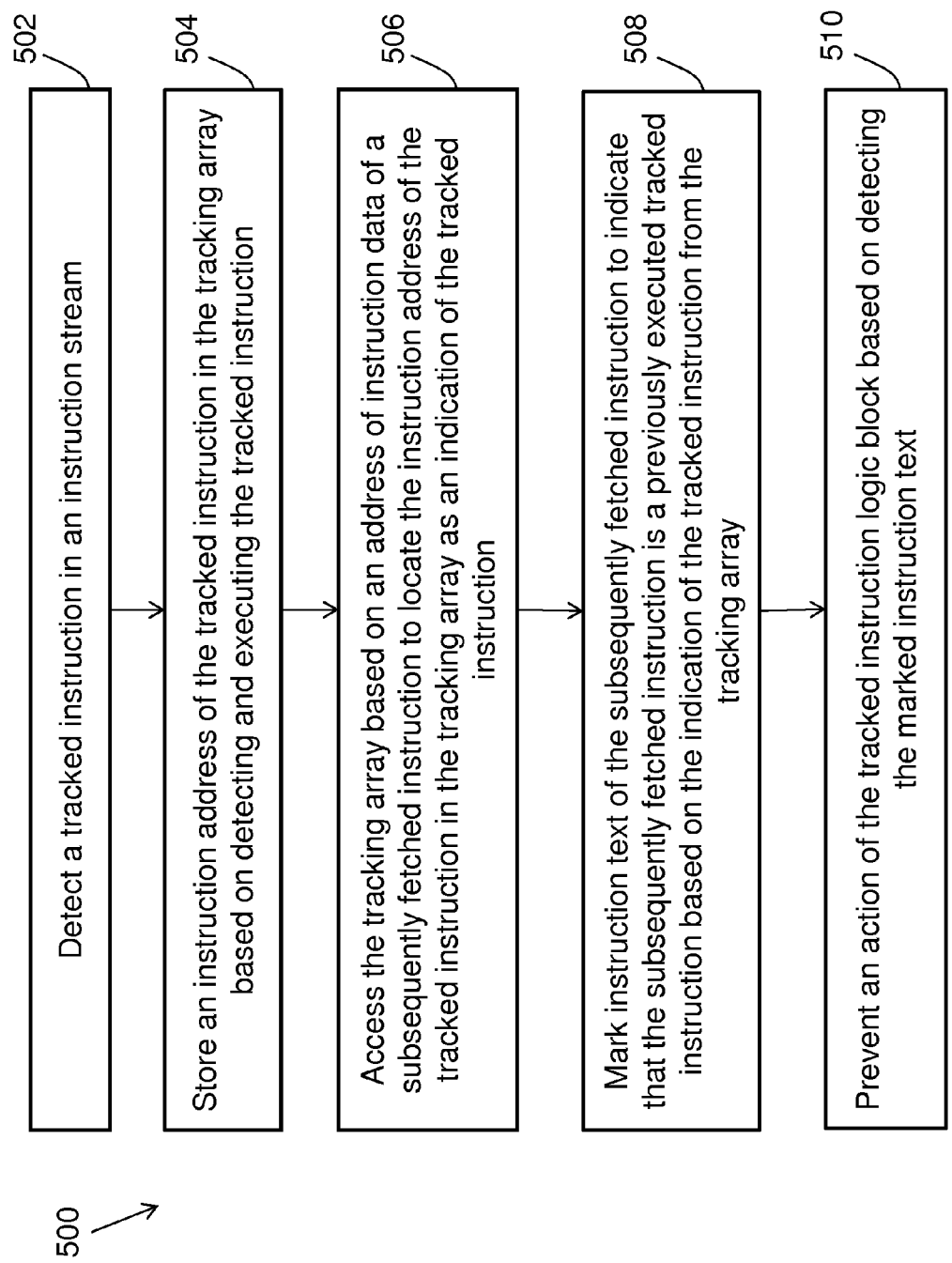
FIG. 5 is a flowchart illustrating a process of instruction filtering according to an embodiment.

Turning now to FIG. 5, a process 500 of instruction filtering will now be described in an exemplary embodiment. The process 500 is described in reference to FIGS. 1-4 and can be implemented by the processing system 100 of FIG. 1 using the BPL 110 or 110' of FIGS. 2 and 4.

At block 502, a tracked instruction is detected in an instruction stream. A branch prediction preload instruction is an example of a tracked instruction. At block 504, an instruction address of the tracked instruction is stored in the tracking array 102, given it is not already in the array, based on detecting and executing the tracked instruction. For example, whenever a branch prediction preload instruction is encountered and executed at execution unit 105, its instruction address is recorded in the tracking array 102. The tracking array 102 can be used to track the instruction addresses of branch prediction preload instructions or other tracked instructions.

At block 506, the tracking array 102 is accessed based on an address of instruction data of a subsequently fetched instruction to locate the instruction address of the tracked instruction in the tracking array 102 as an indication of the tracked instruction. Upon every fetch request made by the program fetch control 101, the address of the instruction data being fetched can be used to access the tracking array 102 in parallel with the instruction cache 103.

At block 508, instruction text of the subsequently fetched instruction is marked to indicate that the subsequently fetched instruction is a previously executed tracked instruction based on the indication of the tracked instruction from the tracking array 102. Marking may be performed at the instruction decode and marking logic 104 to provide an indication to the execution unit 105 that the tracked instruction was already executed and thus, already performed an associated action, such as installing a preloaded branch prediction in branch predictor 200, 400. At block 510, an action of the tracked instruction logic block is prevented based on detecting the marked instruction text. For example, when the marked branch prediction preload instruction is executed at execution unit 105, the mark indicates to the BPL 110 not to install the preloaded branch prediction into the LRU location, effectively making the branch prediction preload instruction a no-op instruction. The LRU entry is preserved.

Entries are removed from the tracking array 102 as newer entries evict older ones. If removal/replacement of entries in the tracking array 102 is based only on addresses, problems can arise where multiple branches alias to the same BTB location. In an embodiment, entries can be selected to remove from the tracking array 102 randomly based on detecting tracked instructions. Randomly removing entries from the tracking array 102 can reduce performance impacts associated with address aliasing and increase the probability that actions of preloading will take place when beneficial to performance. Removal of an entry can be performed by setting an associated validity bit for the entry to invalid and optionally identifying the entry as LRU.

As previously described, a branch prediction preload instruction enables software-driven preloading of the BTB 204 of FIG. 2 or the BTBP 408 of FIG. 4 with a branch prediction at a given address with a given target address. Instruction filtering prevents the same branch prediction from being redundantly installed in the BTB 204 or the BTBP 408. However, multi-target branch type instructions should not be filtered such that only a single preload is performed, since separate preloads may reference different targets from the same instruction address. A multi-target branch is a branch instruction that can have different target addresses from the same instruction address. For example, a branch instruction that functions as a return branch that is callable from different software modules can exhibit different return addresses when returning to each calling module. To allow for multi-target branches to be preloaded as the target address changes, modification of BTB entries can be supported in the instruction filtering of BPL 110, 110'. Typical installation to branch predictors 200, 400 is based on LRU position; however, the LRU position changes over time. Exemplary embodiments install multi-target branches into a predetermined set of the branch predictor 200, 400 rather than the LRU position as further described herein.

Figure 6:
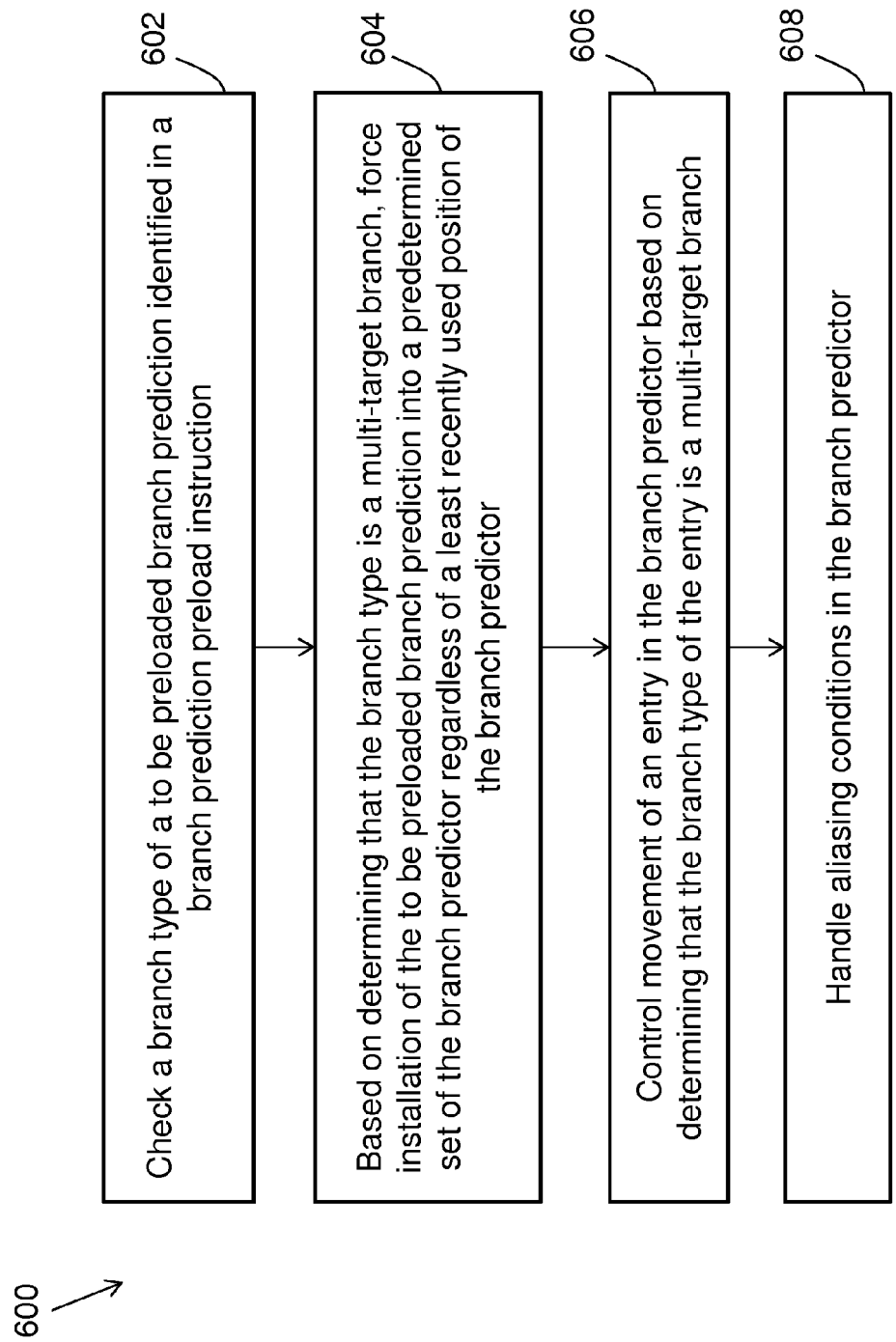
FIG. 6 is a flowchart illustrating a process of handling preloading of multi-target branch types according to an embodiment.

Process 600 of FIG. 6 depicts an example process for handling preloading of multi-target branch types and can be implemented by BPL 110 of FIG. 2 and/or BPL 110' of FIG. 4. At block 602, a branch type of a to be preloaded branch prediction identified in a branch prediction preload instruction is checked. Branch type information can be determined from a mask field of the branch prediction preload instruction. At block 604, based on determining that the branch type is a multi-target branch, installation of the to be preloaded branch prediction is forced into a predetermined set of the branch predictor 200, 400 of FIGS. 2 and 4, regardless of an LRU position of the branch predictor 200, 400. Thus, rather than preventing all installations to branch predictors 200, 400, the BPL 110, 110' can prevent LRU-position based installation and instead force installation to a predetermined set for multi-target branches. Similar to other branch prediction installs, the entry resulting from installation of a preloaded multi-target branch prediction is made most recently used (MRU) to prevent early replacement by a non-multi-target branch install. Using a predetermined set for multi-target branch entries enables modification of existing entries as the branch target address changes. The predetermined set of the branch predictor is determined based on one or more of: a predicted branch instruction address and a thread identifier. For example, when the processing system 100 is implemented in a simultaneous multithreading processor, bits used to identify a thread number can be used to select a set 314 and/or used in combination with prediction branch address bits to select a set 314.

At block 606, movement of an entry in the branch predictor 200, 400 is controlled based on determining that the branch type of the entry is a multi-target branch. For example, in branch predictor 400, installs are first done into the BTBP 408 and then entries are moved into the BTB 404 upon a future prediction from the BTBP 408. Where a branch preload of a multi-target branch is installed into the BTBP 408, movement of multi-target branch entries from the BTBP 408 to the BTB 404 is blocked. Blocking movement prevents a potential mismatch scenario where an entry with a first target address is moved to the BTB 404 and removed from the BTBP 408 followed by installation of a new entry for the same branch instruction having a different target in the BTBP 408.

At block 608, aliasing conditions in the branch predictor 200, 400 are handled by the BPL 110, 110'. For the example of FIG. 4, an alias with the BTB 404 and BTBP 408 may exist such that a given location where a branch is predicted, a branch does not exist, and a different instruction, such as a load instruction exists at the given address instead. In this example, branch prediction and eviction logic 402 of FIG. 4 can determine that a branch alias exists at a location in the BTBP 408 where a multi-target branch is predicted but does not exist. The branch prediction and eviction logic 402 can store an indication of the branch alias for the location in the BTBP 408. The branch prediction and eviction logic 402 invalidates an entry at the location in the BTBP 408 based on detecting the stored indication of the branch alias on a next multi-target branch prediction. The stored indication of the branch alias is also cleared upon the invalidation of the entry.

Figure 7:
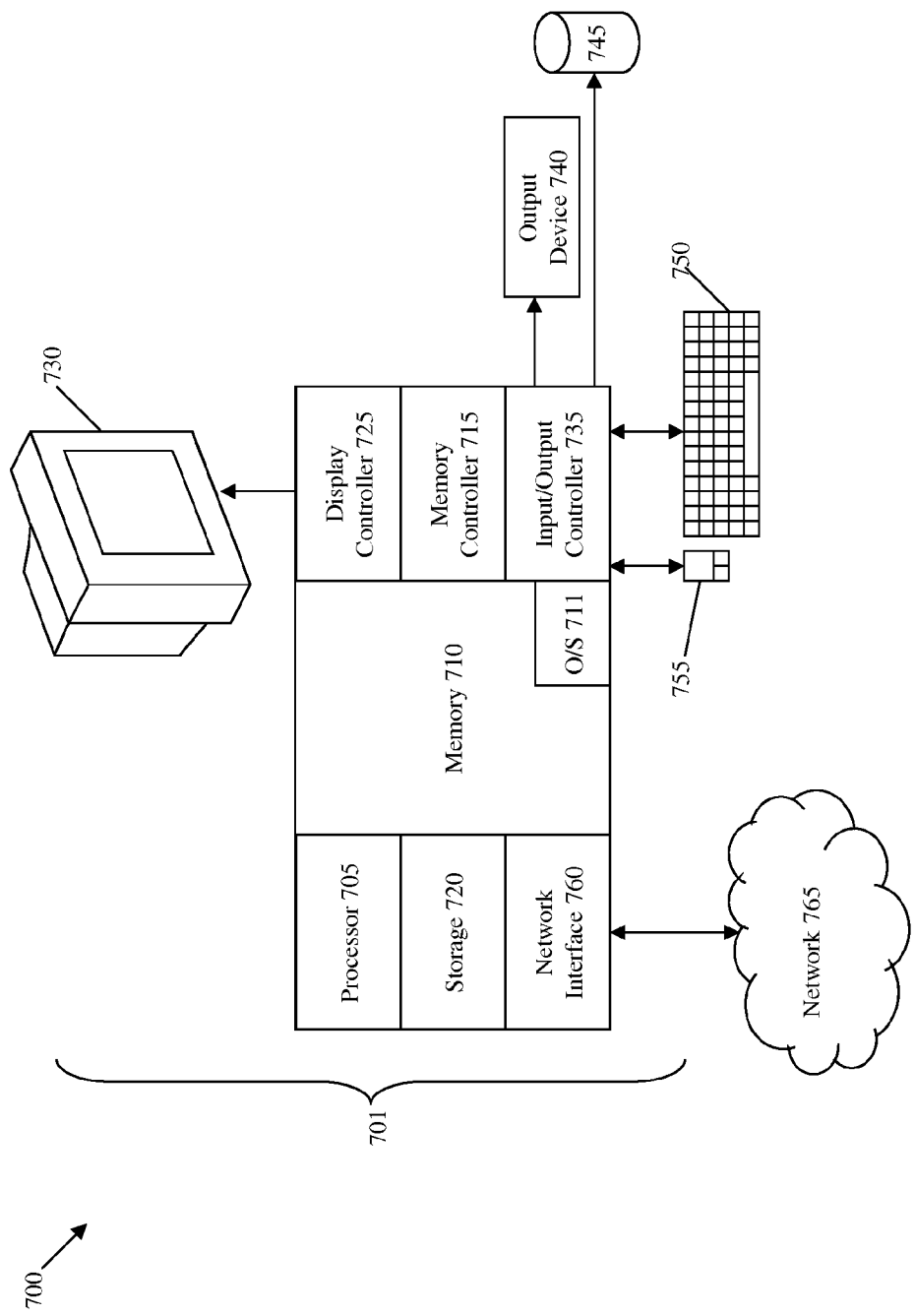
FIG. 7 depicts a computing system according to an embodiment.

FIG. 7 depicts a block diagram of a system 700 for instruction filtering in a processor 705. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 700 therefore includes general-purpose computer 701 as illustrated in FIG. 7.

In an exemplary embodiment, in terms of hardware architecture, as shown in FIG. 7, the computer 701 includes a processor 705 which is a processing circuit that includes the processing system 100 of FIG. 1 or a portion thereof. The computer 701 further includes memory 710 coupled to a memory controller 715, and one or more input and/or output (I/O) devices 740, 745 (or peripherals) that are communicatively coupled via a local input/output controller 735. The input/output controller 735 can be, for example but not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 705 is a hardware device for executing software, particularly that stored in storage 720, such as cache storage, or memory 710. The processor 705 can be any custom made or commercially available processor, a central processing unit (CPU), an auxiliary processor among several processors associated with the computer 701, a semiconductor based microprocessor (in the form of a microchip or chip set), a macroprocessor, or generally any device for executing instructions.

The memory 710 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, and/or other types of storage media. Note that the memory 710 can have a distributed architecture, where various components are situated remote from one another, but can be accessed by the processor 705.

The instructions in memory 710 may include one or more separate programs, each of which includes an ordered listing of executable instructions for implementing logical functions. In the example of FIG. 7, the instructions in the memory 710 a suitable operating system (OS) 711. The operating system 711 essentially controls the execution of other computer programs and provides scheduling, input-output control, file and data management, memory management, and communication control and related services.

In an exemplary embodiment, a conventional keyboard 750 and mouse 755 can be coupled to the input/output controller 735. Other output devices such as the I/O devices 740, 745 may include input devices, for example but not limited to a printer, a scanner, microphone, and the like. Finally, the I/O devices 740, 745 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 700 can further include a display controller 725 coupled to a display 730. In an exemplary embodiment, the system 700 can further include a network interface 760 for coupling to a network 765. The network 765 can be an IP-based network for communication between the computer 701 and any external server, client and the like via a broadband connection. The network 765 transmits and receives data between the computer 701 and external systems. In an exemplary embodiment, network 765 can be a managed IP network administered by a service provider. The network 765 may be implemented in a wireless fashion, e.g., using wireless protocols and technologies, such as WiFi, WiMax, etc. The network 765 can also be a packet-switched network such as a local area network, wide area network, metropolitan area network, Internet network, or other similar type of network environment. The network 765 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 701 is a PC, workstation, intelligent device or the like, the instructions in the memory 710 may further include a basic input output system (BIOS) (omitted for simplicity). The BIOS is a set of essential software routines that initialize and test hardware at startup, start the OS 711, and support the transfer of data among the hardware devices. The BIOS is stored in ROM so that the BIOS can be executed when the computer 701 is activated.

When the computer 701 is in operation, the processor 705 is configured to fetch and execute instructions stored within the memory 710, to communicate data to and from the memory 710, and to generally control operations of the computer 701 pursuant to the instructions.

In an exemplary embodiment, where the BPLs 110, 110' of FIGS. 2 and 4 are implemented in hardware, the methods described herein, such as processes 500 and 600 of FIGS. 5 and 6, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 8:
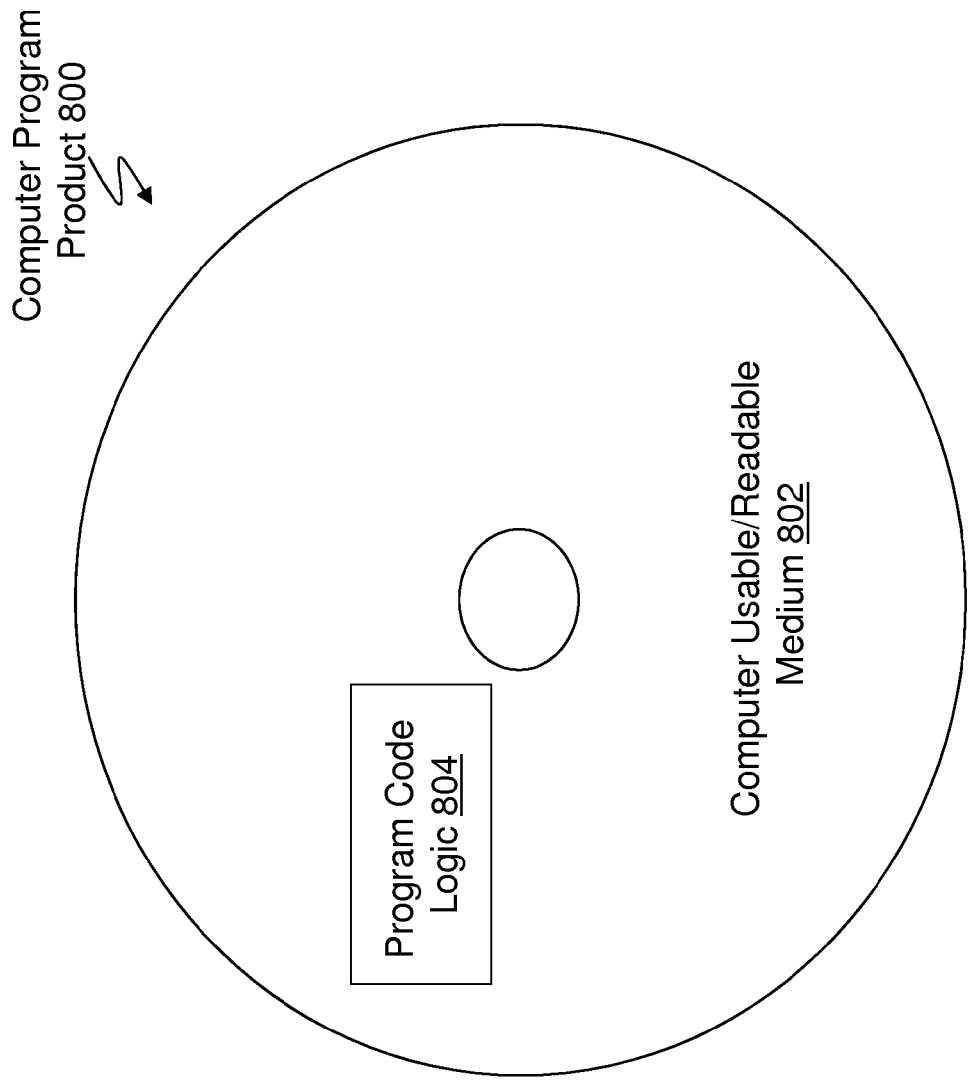
FIG. 8 depicts a computer-readable medium according to an embodiment.

Referring now to FIG. 8, in one example, a computer program product 800 includes, for instance, one or more storage media 802, wherein the media may be tangible and/or non-transitory, to store computer readable program code means or logic 804 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Embodiments include a system, method, and computer program product for instruction filtering. The system includes memory configured to store instructions accessible by a processor, and the processor includes a tracking array and a tracked instruction logic block. The processor is configured to perform a method including detecting, by the processor, a tracked instruction in an instruction stream, and storing an instruction address of the tracked instruction in the tracking array based on detecting and executing the tracked instruction. The method also includes accessing the tracking array based on an address of instruction data of a subsequently fetched instruction to locate the instruction address of the tracked instruction in the tracking array as an indication of the tracked instruction. The method further includes marking, by the processor, instruction text of the subsequently fetched instruction to indicate that the subsequently fetched instruction is a previously executed tracked instruction based on the indication of the tracked instruction from the tracking array. An action of the tracked instruction logic block is prevented based on detecting the marked instruction text.

In an embodiment, accessing of the tracking array is performed in parallel with accessing an instruction cache prior to instruction decoding of the subsequently fetched instruction. In an embodiment, the processor of the system is further configured to select entries to remove from the tracking array randomly based on detecting tracked instructions, and remove the randomly selected entries from the tracking array. In an embodiment, the tracked instruction is a branch prediction preload instruction, the tracking array is a branch prediction preload tracking array, the tracked instruction logic block is branch prediction logic, and the action is installation of a to be preloaded branch prediction to a branch predictor.

In an embodiment, the processor of the system is further configured to check a branch type of the to be preloaded branch prediction identified in the branch prediction preload instruction. Based on determining that the branch type is a multi-target branch, the prevented action is preventing installation of the to be preloaded branch prediction to a least recently used position of the branch predictor, and instead forcing installation of the to be preloaded branch prediction into a predetermined set of the branch predictor. In an embodiment, the branch predictor includes a branch target buffer and a branch target buffer preload table, and the processor is configured to prevent movement of an entry in the branch target buffer preload table to the branch target buffer based on determining that the branch type of the entry is the multi-target branch. In an embodiment, the predetermined set of the branch predictor is determined based on one or more of: a predicted branch instruction address and a thread identifier.

In an embodiment, the processor of the system is further configured to determine that a branch alias exists at a location in the branch target buffer preload table where a multi-target branch is predicted but does not exist. An indication of the branch alias is stored for the location in the branch target buffer preload table. An entry at the location in the branch target buffer preload table is invalidated based on detecting the stored indication of the branch alias on a next multi-target branch prediction, and the stored indication of the branch alias is cleared.

Technical effects and benefits include instruction filtering. Embodiments recognize tracked instructions that have been previously executed and thereby prevent actions of the tracked instructions from being repeated upon subsequently encountering tracked instruction. For example, embodiments can prevent repeated preload installations into a branch predictor as well as additional instruction cache prefetches. Embodiments also handle preloading of branches with multiple targets and aliasing with a non-branch instruction.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for instruction filtering, the system comprising:
   a memory configured to store instructions accessible by a processor; and
   the processor comprising a tracking array and a tracked instruction logic block, wherein the processor is configured to perform a method comprising:
   detecting, by the processor, a tracked instruction in an instruction stream;
   storing an instruction address of the tracked instruction in the tracking array based on detecting and executing the tracked instruction;
   accessing the tracking array based on an address of instruction data of a subsequently fetched instruction to locate the instruction address of the tracked instruction in the tracking array as an indication of the tracked instruction;
   marking, by the processor, instruction text of the subsequently fetched instruction to indicate that the subsequently fetched instruction is a previously executed tracked instruction based on the indication of the tracked instruction from the tracking array; and
   preventing an action of the tracked instruction logic block based on detecting the marked instruction text.

2. The system of claim 1, wherein accessing of the tracking array is performed in parallel with accessing an instruction cache prior to instruction decoding of the subsequently fetched instruction.

3. The system of claim 1, wherein the processor is configured to perform:
   selecting entries to remove from the tracking array randomly based on detecting tracked instructions; and
   removing the randomly selected entries from the tracking array.

4. The system of claim 1, wherein the tracked instruction is a branch prediction preload instruction, the tracking array is a branch prediction preload tracking array, the tracked instruction logic block is branch prediction logic, and the action is installation of a to be preloaded branch prediction to a branch predictor.

5. The system of claim 4, wherein the processor is configured to perform:
   checking a branch type of the to be preloaded branch prediction identified in the branch prediction preload instruction; and
   based on determining that the branch type is a multi-target branch, the prevented action is preventing installation of the to be preloaded branch prediction to a least recently used position of the branch predictor, and instead forcing installation of the to be preloaded branch prediction into a predetermined set of the branch predictor.

6. The system of claim 5, wherein the branch predictor further comprises a branch target buffer and a branch target buffer preload table, and the processor is configured to perform:
   preventing movement of an entry in the branch target buffer preload table to the branch target buffer based on determining that the branch type of the entry is the multi-target branch.

7. The system of claim 6, wherein the processor is configured to perform:
   determining that a branch alias exists at a location in the branch target buffer preload table where a multi-target branch is predicted but does not exist;
   storing an indication of the branch alias for the location in the branch target buffer preload table; and
   invalidating an entry at the location in the branch target buffer preload table based on detecting the stored indication of the branch alias on a next multi-target branch prediction, and clearing the stored indication of the branch alias.

8. The system of claim 5, wherein the predetermined set of the branch predictor is determined based on one or more of: a predicted branch instruction address and a thread identifier.

* * * * *